Aug. 23, 1955  A. SHACIKOSKI  2,716,019
DUST COLLECTOR
Filed July 17, 1953  2 Sheets-Sheet 1

Anthony Shacikoski
INVENTOR.

Aug. 23, 1955   A. SHACIKOSKI   2,716,019
DUST COLLECTOR
Filed July 17, 1953   2 Sheets-Sheet 2
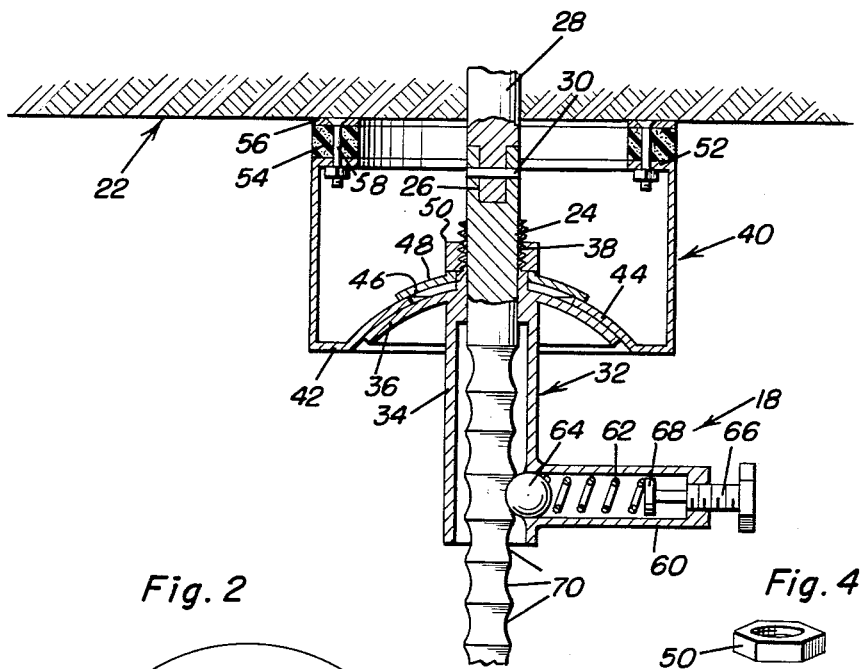
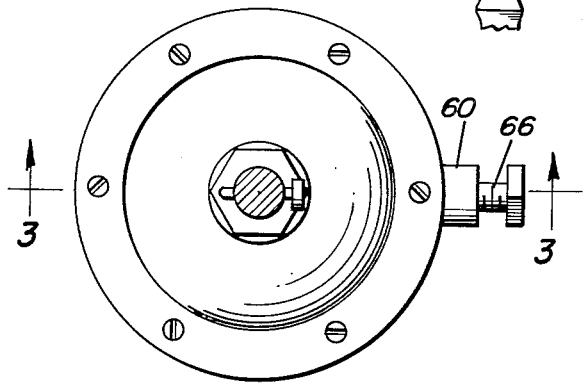
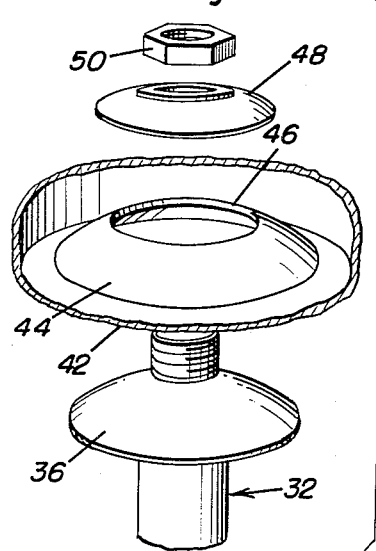
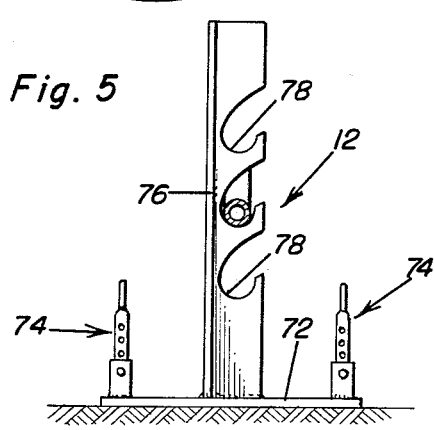
Anthony Shacikoski
INVENTOR.

United States Patent Office 2,716,019
Patented Aug. 23, 1955

2,716,019
DUST COLLECTOR
Anthony Shacikoski, Avonmore, Pa.
Application July 17, 1953, Serial No. 368,607
4 Claims. (Cl. 255—50)

This invention relates generally to dust collecting mechanism and pertains more specifically to an improved form of dust collector for use particularly in mines and the like.

A primary object of this invention is to provide an improved form of dust collector to be utilized during drilling operations to effectively maintain a seal between the collector and the material being drilled so as to prevent pollution of the surrounding air and formation of a fire and explosion hazard.

Another object of this invention is to provide an accessory attachment for drills which will effectively collect dust during drilling operations, the attachment including a dust collecting cup universally connected to an adapter rod for progressive sliding movement therealong as the drill bit is led into the material being drilled.

Still another object of this invention is to provide an improved form of dust collector which incorporates a rod-like member provided with a series of circumferential notches or grooves and a dust collector assembly including a cup assembly progressively latched in the series of the grooves.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a top plan view of the dust collector assembly showing the adapter rod in sections;

Figure 3 is a longitudinal section taken substantially along the plane of section line 3—3 in Figure 2 showing details of the collector assembly;

Figure 4 is an exploded perspective view of the couplings mechanism utilized between the cup member and the adapter sleeve;

Figure 5 is a vertical section taken substantially along the plane of section line 5—5 of Figure 1.

Figure 1:
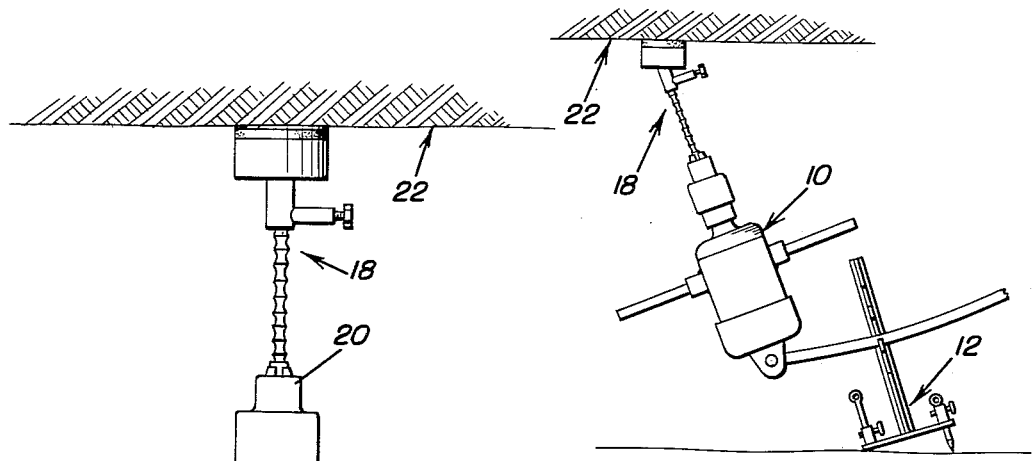
Figure 1 is an elevational view showing a drill utilizing the dust collector assembly.

Referring more particularly to the drawings, reference numeral 10 indicates generally a drill which is provided with any suitable means of power such as air under pressure and the reference numeral 12 indicates generally a standard or lever base by means of which the associated lever 14 is connected to the drill as at 16 for imparting force to the same necessary in drilling operations. A dust collector assembly indicated generally by the reference character 18 is secured within the chuck 20 of the drill 10 and reference numeral 22 indicates the overhead surface of material such as coal and the like which is being drilled.

Referring now more particularly to Figure 3, it will be seen that the dust collector assembly 18 includes a rod member 24 which is suitably formed at its lower end to be received within the drill chuck 20 and which is slotted as at 26 at its upper end for reception of the drill bit 28 which may be secured thereto as by the pin 30. It is to be understood that any suitable means for securing the rod 24 to an associated drill bit 28 may be utilized.

A connector sleeve indicated generally by the reference character 32 includes the main body portion 34 which is provided adjacent its upper end with the concavo-convex annular flange 36, the upper end of the sleeve terminating in the threaded portion 38 in the manner shown. The rod 24 is freely rotatable in the upper portion of the connector sleeve 32. The collector cup indicated generally by the reference character 40 may be formed of substantially cylindrical configuration with its bottom 42 inwardly dished in the central portion 44 thereof and provided with an enlarged aperture 46 for a purpose presently apparent. The dished portion 44 seats upon the flange 36 of the connector sleeve and a concavo-convex washer 48 seats, in turn, upon the inner surface of the dished bottom, the nut 50 being engaged on the threaded portion 38 of the sleeve to maintain suitable frictional engagement between the washer 48, the flange 36 and the dished portion 44 of the collector cup so as to provide a snug universal joint coupling therebetween. As will be readily apparent, the enlarged opening 46 in the cup bottom permits this member to assume various angular positions with respect to the connector sleeve and hence the rod member 24.

The upper edge of the cup 40 is provided with the inturned flange 52 which provides a seat for the annular gasket 54 which may be formed of suitable resilient material such as foam rubber or the like, and a protector ring 56 is seated upon the gasket in the manner shown with the fasteners 58 extending therethrough and into the flange 52 for maintaining the gasket and protector ring in place. The purpose of this construction will be presently apparent.

The lower end of the connector sleeve is provided with a radially extending tubular member or housing 60 which communicates with the bore of the sleeve and which houses the coil spring 62 and the ball member 64, the screw 66 being threadedly engaged in the free end of the housing and terminating in the plunger portion 68 engaging the spring 62 to vary the tension thereof. The rod 24 is formed substantially throughout its entire length with a series of circumferential grooves 70 which are formed in conformity with the surface of the ball member 64 so that, under action of the coil spring 62, the ball will effectively latch the sleeve at various longitudinal points along the rod while at the same time permitting the sleeve to be slid in step-by-step fashion along the rod when sufficient force is exerted on the sleeve to overcome the action of the coil spring 62, as will be readily apparent.

Referring now more particularly to Figures 1 and 5, it will be noted that the standard or base assembly 12 includes the base plate 72 which may be provided with a series of leg assemblies 74 at each of its corners and upon which the upright 76 is mounted, the same being provided with a series of longitudinal notches 78 to form a fulcrum point for the lever member 14.

In operation of the assembly, it will be manifest that the drill bit 28 is engaged with the material being drilled and the cup member 40 forced along the rod 24 until the protector ring 56 is in engagement with the surface being drilled. As the drill bit is fed into the material being drilled, the rod 24 will carry the collector cup and connector sleeve with it to form an effective seal against the surface of the material, the gasket 54 being compressed during this operation. When the drill bit has entered the material being drilled in a sufficient amount to overcome the action from the coil spring 62, the ball 64 will jump into the next lower circumferential groove while at the same time the gasket 54 will expand to maintain the protector ring 56 in engagement with the surface of the material being drilled, as will be manifest. Of course, the member 66 is manually adjusted to maintain the proper tension on the coil spring 62.

Figure 6:
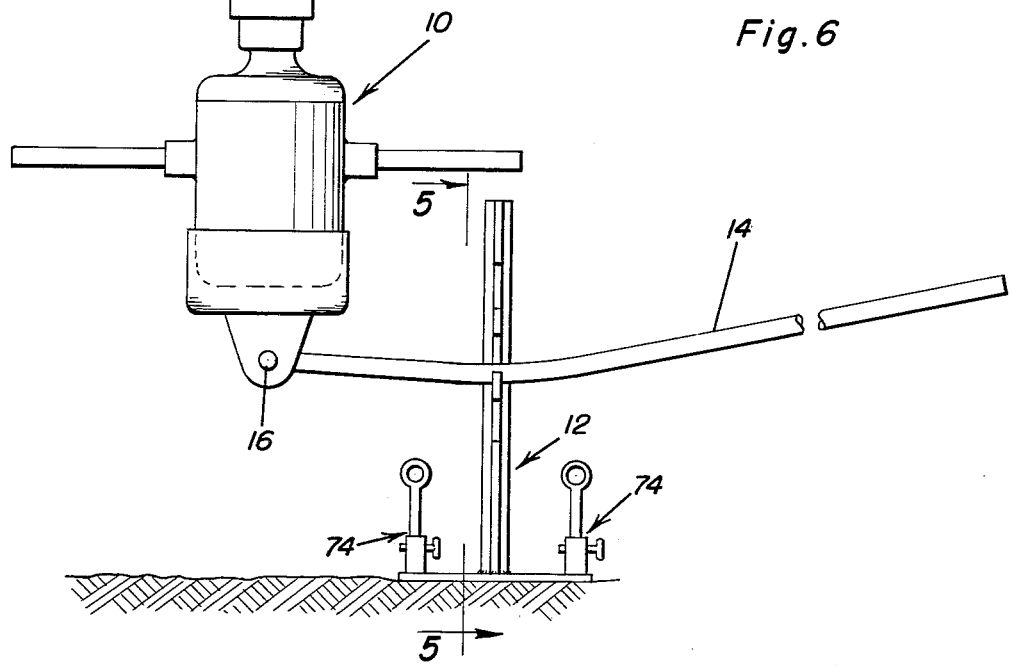
Figure 6 is an elevational view showing the dust collector assembly being utilized in angle drilling operation.

In angle drilling operation such as that indicated in Figure 6, wherein the standard assembly 12 may have the extensible leg assemblies at one side thereof extended, the collector cup 40, by virtue of its universal connection to the sleeve 32, will permit the protector ring to be effectively engaged against the surface of the material being drilled.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A dust collector assembly comprising a rod member adapted for attachment to a drill bit at one end and to a drill chuck at its other end, a collector cup slidably secured to said rod with its open end facing said one end of the rod, means for resisting sliding of said cup on said rod for effecting continuous engagement of the open edge of the cup against the material being drilled, a connector sleeve concentrically disposed on said rod, said sleeve including a convex flange, the bottom of said collector cup being inwardly dished to seat upon said flange and provided with an enlarged central aperture, and a concave retaining washer seated upon the inner surface of said dished bottom and carried by said sleeve.

2. The combination of claim 1 wherein the lower end of said sleeve is provided with a radial housing, said means comprising a series of circumferential grooves in said rod, a spring carried within said housing and a ball projecting from said housing into said grooves.

3. The combination of claim 1 wherein said means includes a series of circumferential, longitudinally spaced grooves in said rod.

4. The combination of claim 1 wherein said means includes a series of circumferential, longitudinally spaced grooves in said rod, and a ball resiliently engaged within said grooves.

References Cited in the file of this patent

UNITED STATES PATENTS

| | | |
|---|---|---|
| 895,228 | Bartlett | Aug. 4, 1908 |
| 1,057,568 | Mayer et al. | Apr. 1, 1913 |

FOREIGN PATENTS

| | | |
|---|---|---|
| 371,463 | Germany | Mar. 15, 1923 |
| 589,558 | Germany | Dec. 11, 1933 |